(12) United States Patent
Daghini et al.

(10) Patent No.: US 8,746,307 B2
(45) Date of Patent: Jun. 10, 2014

(54) PNEUMATIC TIRE HAVING AN IMPROVED BELT STRUCTURE

(75) Inventors: Guido Luigi Daghini, Milan (IT); Stefano Bizzi, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1660 days.

(21) Appl. No.: 12/086,641

(22) PCT Filed: Dec. 23, 2005

(86) PCT No.: PCT/EP2005/057165
§ 371 (c)(1),
(2), (4) Date: Aug. 4, 2010

(87) PCT Pub. No.: WO2007/073776
PCT Pub. Date: Jul. 5, 2007

(65) Prior Publication Data
US 2010/0289232 A1    Nov. 18, 2010

(51) Int. Cl.
*B60C 9/22*    (2006.01)
(52) U.S. Cl.
USPC .............. 152/531; 280/29; 152/534; 152/526
(58) Field of Classification Search
USPC ..................... 280/29; 152/526, 531, 534, 535
IPC .......................................................... B60C 9/22
See application file for complete search history.

(56) References Cited

U.S. PATENT DOCUMENTS

| | | | |
|---|---|---|---|
| 4,883,108 A * | 11/1989 | Takahashi et al. ............. | 152/531 |
| 5,591,284 A * | 1/1997 | Gaudin .......................... | 152/532 |
| 6,260,596 B1 * | 7/2001 | Ubukata et al. ............... | 152/534 |
| 6,367,527 B1 | 4/2002 | Cluzel | |
| 2001/0042581 A1 * | 11/2001 | Boiocchi et al. ............... | 152/527 |
| 2005/0144926 A1 * | 7/2005 | Kobayashi et al. ............. | 57/212 |

FOREIGN PATENT DOCUMENTS

| | | |
|---|---|---|
| AT | 356 524 | 5/1980 |
| DE | 32 02 039 A1 | 7/1983 |
| EP | 0 477 771 B1 | 5/1995 |
| EP | 0 531 136 B1 | 11/1995 |
| EP | 1 071 567 B1 | 5/2002 |
| EP | 0 928 680 B1 | 3/2003 |

(Continued)

OTHER PUBLICATIONS

English Language Machine Translation of AT356524, 1980.*

*Primary Examiner* — Justin Fischer
*Assistant Examiner* — Philip N Schwartz
(74) *Attorney, Agent, or Firm* — Finnegan, Henderson, Farabow, Garrett & Dunner, L.L.P.

(57) ABSTRACT

A pneumatic tire having a belt structure includes: a first belt layer; a second belt layer in a radially inner position with respect to the first belt layer, a third belt layer in a radially inner position with respect to the first and second belt layers, each belt layer including a plurality of elongated reinforcing elements disposed at a first, second and third belt angle respectively. The first and second belt angles have an absolute value of 15 to 40 degrees; the second angle is of opposite sign with respect to the first belt angle; and the third belt angle has an absolute value of 40 to 90 degrees and is of opposite sign with respect to the second belt angle. The belt structure also includes a zero degree belt layer placed in a radially outer position with repeat to the first belt layer including elongated reinforcing elements arranged such as to form a belt angle which is substantially zero.

19 Claims, 8 Drawing Sheets

(56) References Cited

FOREIGN PATENT DOCUMENTS

| | | |
|---|---|---|
| EP | 0 928 702 B1 | 9/2003 |
| EP | 1 057 659 B1 | 7/2006 |
| GB | 2017019 A * | 9/1979 ................ B60C 9/20 |
| JP | 10-203112 | 8/1998 |
| JP | 2001-512390 | 8/2001 |
| JP | 2007-137172 | 6/2007 |
| WO | WO-00/39385 | 7/2000 |
| WO | WO-2005/014309 A1 | 2/2005 |
| WO | WO 2005/025895 A1 | 3/2005 |

* cited by examiner

PNEUMATIC TIRE HAVING AN IMPROVED BELT STRUCTURE

CROSS REFERENCE TO RELATED APPLICATION

This application is a national phase application based on PCT/EP2005/057165, filed Dec. 23, 2005, the content of which is incorporated herein by reference.

BACKGROUND OF THE INVENTION

1. Field of the Invention

The present invention relates to a pneumatic tire suitable for being used in four-wheeled vehicles.

In particular, the present invention relates to a high performance tire such as, for example, a tire designed for high-powered cars or, more generally, a tire intended for applications involving high operating speeds and/or extreme driving conditions.

In more details, the present invention relates to a high performance (HP) or ultra high performance (UHP) tire as well as to a tire suitable for being employed in sporting contests such as track motor races. Preferably, the tire according to the invention is of the type with a markedly flattened section.

More in particular, the present invention concerns an improved belt structure of a pneumatic tire for four-wheeled vehicles.

2. Description of the Related Art

A pneumatic tire generally comprises: a toroidal carcass structure comprising at least one carcass ply; a tread band in a position radially external to the carcass structure; a belt structure interposed between the carcass structure and the tread band; a pair of sidewalls applied to the carcass structure in axially opposite positions. The ends of the at least one carcass ply are associated to respective annular reinforcing elements so as to form tire beads, which secure the tire to a wheel rim.

Several belt structures are known in the art of tires for motor vehicles.

EP 0 477 771 B1 discloses a three-belt tire having at least one carcass ply, a tread, a pair of sidewalls, a pair of beads and a belt package located between the tread and the carcass ply. The belt package has three radially arranged plies. First and third plies of the belt package include a plurality of substantially parallel extending polymeric monofilament reinforcing members disposed at a first angle relative to the equatorial plane in the range of about +15 to +20 degrees. A second ply of the belt package is located between the first and third plies and includes a plurality of substantially parallel extending metallic reinforcing members disposed at a second angle in the range of about −15 to −25 degrees relative to the equatorial plane. The second ply is centered relative to the equatorial plane and has an axial width. The first and third plies are centered relative to the equatorial plane and have respective axial widths which are substantially equal to each other and being greater than the axial width of said second ply. Axial edge portions of the first and third plies contact each other.

EP 0 531 136 B1 discloses a high performance pneumatic radial tire including a tread surface formed with a plurality of circumferential grooves, a radial carcass, a belt composed of two belt layers of metal cords, an additional reinforcing layer arranged on a radially outer side of the belt and at an axially central area of the tread, and at least two additional auxiliary layers arranged at each of widthwise opposite side portions of the tread and composed of organic fiber cords. The additional reinforcing layer is composed of cords crossing the metal cords in the belt layer adjacent thereto and inclined with respect to the tire-circumferential direction, and has a width less than the minimum width of the belt but greater than a distance between the circumferential grooves located at widthwise outermost sides of the tread, respectively.

EP 1 057 659 A2 discloses a pneumatic radial tire for passenger car comprising a carcass of a radial structure toroidally extending between a pair of bead cores and comprised of at least one rubberized carcass ply containing organic fiber cords therein, and a belt reinforcing a crown portion of the carcass and comprised of plural belt layers, wherein at least one carcass ply has a cut-out zone in its crown portion and a carcass supporting layer is arranged adjacent to the cut-out zone.

EP 1 071 567 B1 discloses a pneumatic tire comprising a pair of substantially parallel annular beads, at least one reinforced carcass ply wrapped around the pair of beads, a folded belt structure comprising at least one folded belt and at least one cut belt and an overlay disposed over the at least one carcass ply, tread rubber disposed over the folded belt structure, and sidewalls disposed between the beads and the tread rubber. In the illustrated embodiment, the overlay substantially covers edges of the cut belt and is adjacent to the cut belt, and folded edges of the folded belt are folded over edges of the at least one cut belt and the overlay. The folded belt may be reinforced with filaments or cords selected from the group consisting of fiberglass, aramid, carbon fibers, nylon, rayon, polyester, polyol, and mixtures thereof, and the cut belt may be reinforced with filaments or cords selected from the group consisting of steel, fiberglass, aramid, carbon fibers, nylon, rayon, polyester, polyol, and mixtures thereof. The overlay is reinforced with filaments or cords selected from the group consisting of fiberglass, aramid, carbon fibers, nylon, polyester, polyol, and mixtures thereof.

SUMMARY OF THE INVENTION

The Applicant has perceived the need of increasing the performance of a high or ultra high performance tire of a type indicated above.

In particular, the Applicant has perceived the need of providing a HP or UHP tire which is especially adapted to operate at high accelerations and decelerations which occur with high-powered cars.

Moreover, the Applicant has perceived the need of providing a tire whose belt structure is able to increase the dimensional stability thereof at high speeds, i.e. the capability of the tire to withstand centrifugal force at high speeds without substantially modifying its shape, so as to maintain size and shape of the contact area at high speeds (e.g. greater than 200 Km/h).

The Applicant has also perceived the need of providing a HP or UHP tire showing a tread profile as flat as possible when it is used in extreme driving conditions, especially when the high-powered car is running along bends at high speeds.

In accordance with the present invention the following definitions are given:
 "equatorial plane" (EP) is the plane perpendicular to the tire rotational axis and containing the axial centerline of the tire;
 "aspect ratio" is the ratio of the tire cross-section height (H), i.e. the radial distance from the nominal rim diameter (RW) to the outer diameter of the tire at its equatorial plane, divided by the tire cross-section width (C), i.e. the maximum linear distance parallel to the tire rotation axis between the outer surfaces of the sidewalls (the above dimensions are determined according to the ETRTO Standard);

"rolling direction" (RD) is the advancing direction of a tire when mounted on a vehicle. It may be graphically represented by an arrowed axis placed at the equatorial plane of the tire.

"belt angle" (BA) is the smallest angle formed by the lying direction of the substantially parallel elongated reinforcing elements of a belt with respect to the rolling direction, assuming that the belt is planar. The reinforcing elements of a belt are arranged at a belt angle of zero degrees when they are parallel to the rolling direction. A belt angle is positive when it is determined by rotating the rolling direction clockwise to overlap to the lying direction of the elongated reinforcing elements. A belt angle is negative when it is determined by rotating the rolling direction counterclockwise to overlap to the lying direction of the elongated reinforcing elements. Two belt layers are said to have belt angles of opposite sign when the belt angle of the first layer is negative and the belt angle of the second angle is positive.

The Applicant has found that the above improved performance can be achieved by providing a tire with a belt structure comprising:

a first belt layer comprising a plurality of substantially parallel elongated reinforcing elements disposed at a first belt angle; and a second belt layer in a radially inner position with respect to said first belt layer, comprising a plurality of substantially parallel elongated reinforcing elements disposed at a second belt angle of opposite sign with respect to the first belt angle;

wherein the first and second belt angles have an absolute value of from 15 to 40 degrees;

a zero degree belt layer placed in a radially outer position with respect to the first belt layer, said zero degree belt layer comprising elongated reinforcing elements which are substantially parallel to each other and arranged such as to form a belt angle which is substantially zero;

wherein said belt structure further comprises:

a third belt layer in a radially inner position with respect to said first and second belt layer, said third belt layer comprising a plurality of substantially parallel elongated reinforcing elements disposed at a third belt angle; wherein the third belt angle has an absolute value of from 40 to 90 degrees and is of opposite sign with respect to the second belt angle.

Preferably, the elongated reinforcing elements of the third belt layer are metal cords, more preferably steel cords.

Preferably, the first and second belt angles have the same absolute value.

Preferably, the third belt layer has a width which corresponds to a width of the first belt layer. The second belt layer has preferably a width which is higher than the width of said third belt layer.

In one embodiment, the third belt layer is interrupted in a central area crossing a tire equatorial plane.

The belt angle of the zero degree belt layer has an absolute value not greater than 5 degrees. The reinforcing elements of the zero degree belt layer are preferably textile cords.

According to a further aspect, the present invention relates to a four-wheeled vehicle comprising a front axle and a rear axle, the front axle being equipped with a first tire and a second tire, the rear axle being equipped with a third and a fourth tire, wherein said tires are as set forth above.

According to a preferred embodiment, in the four-wheeled vehicle according to the present invention, the third belt layers of the first tire and of the second tire have a belt angle with an absolute value of from 50 to 75 degrees, while the third belt layers of the third tire and of the fourth tire have a belt angle with an absolute value of from 75 to 90 degrees.

BRIEF DESCRIPTION OF THE DRAWINGS

Further features and advantages will become more apparent from the detailed description of preferred but non-exclusive embodiments of a tire in accordance with the present invention. The present description should be taken with reference to the accompanying drawings, given by way of non limiting example.

In the drawings.

DETAILED DESCRIPTION OF THE INVENTION

Figure 1:
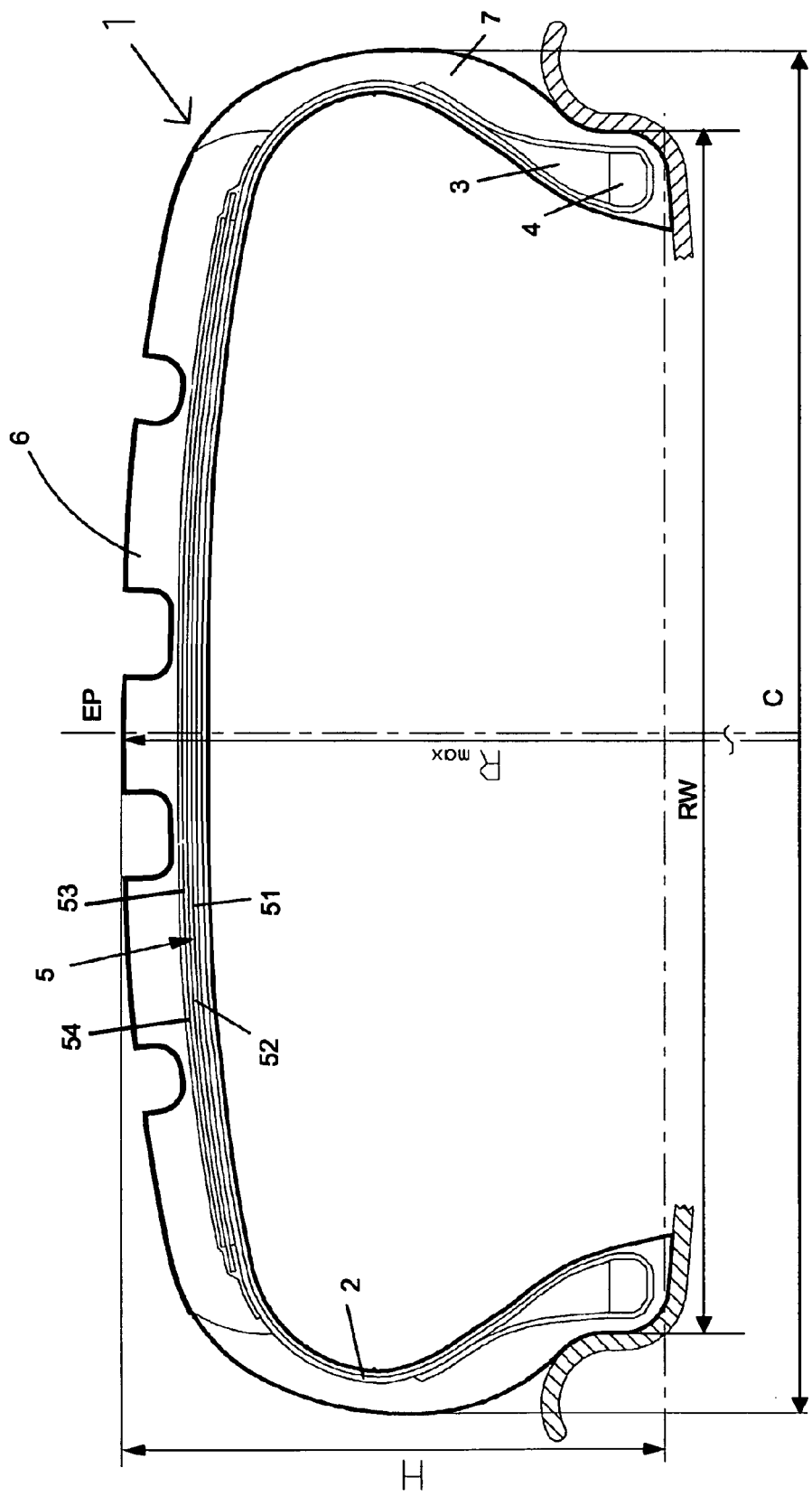
FIG. 1 shows a cross sectional view of a tire according to an embodiment of the present invention.
Figure 2C:
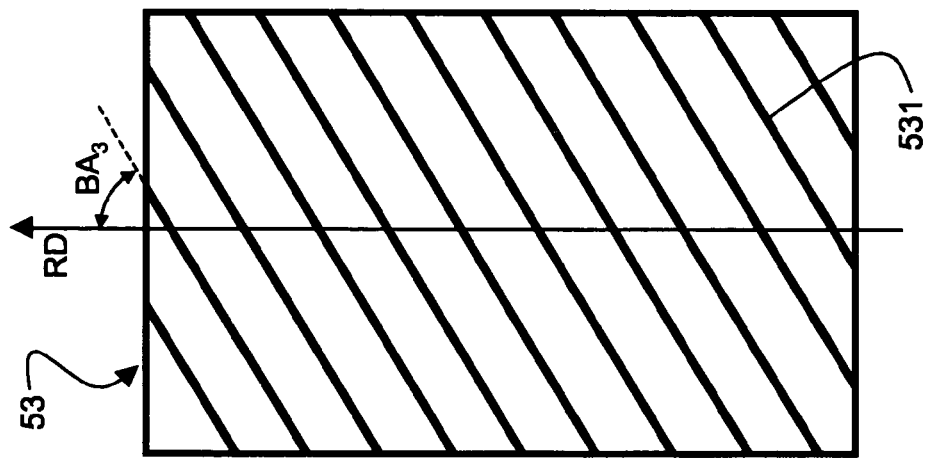
FIGS. 2a, 2b and 2c show, through a schematic plane top view, the three belt plies of the belt structure of the tire according to an embodiment of the present invention.
Figure 2B:
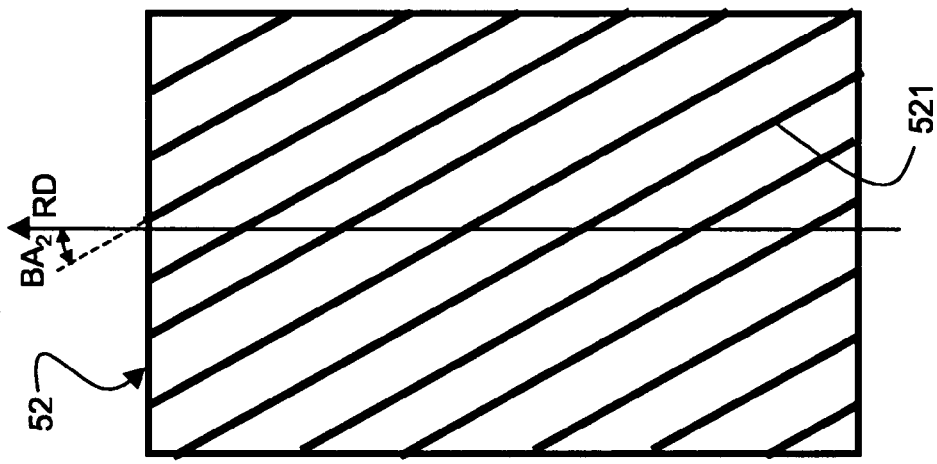
Figure 2A:
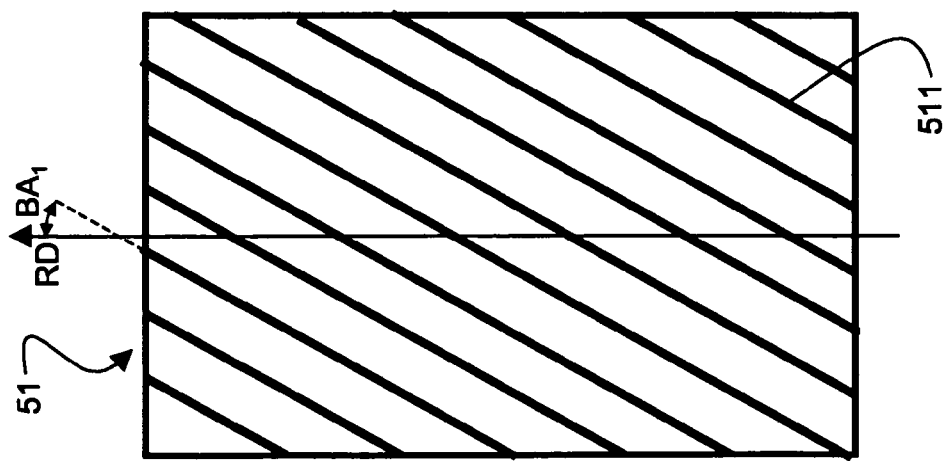

In the drawings, the parallel elongated reinforcing elements are schematically represented to show how they are arranged in the tire, but with an end count (or density) which does not correspond to that actually used.

With reference to FIG. 1, a tire 1 according to the present invention conventionally comprises a torodial carcass structure 2, which comprises a crown portion and two axially opposite side portions, each associated to a respective bead structure for mounting the tire on a rim. The carcass structure 2 includes at least one carcass ply formed by reinforcing elongated elements embedded in a rubber material. The carcass structure is usually of a radial type, i.e. the reinforcing elements of the at least one carcass ply lie on planes including the tire rotation axis and substantially perpendicular to the tire equatorial plane. Said reinforcing elements are generally made of textile cords, e.g. rayon, nylon, polyester (e.g. polyethylene naphthalate (PEN)). Each bead structure usually comprises a bead wire 3 and a bead filler 4 and is associated to the carcass structure by folding back the opposite lateral edges of the carcass ply 2 around the bead wires so as to form the so-called carcass back-folds as shown in FIG. 1.

Alternative bead structures are shown, for instance, in European patent applications EP 0 928 680 and EP 0 928 702, where each bead structure is formed by at least two annular inserts formed from metal cords arranged in concentric coils, and the carcass ply is not back-folded around said annular inserts.

A tread band 6 is circumferentially applied in a position radially external to the crown portion of the carcass structure 2. Sidewalls 7 are also applied externally onto each axially opposite side portion of the carcass structure, each of these sidewalls extending from the respective bead structure to the edge of the tread band 6.

Preferably, the tire 1 according to the invention is of the type with a markedly flattened section, namely the tire of the invention preferably has an aspect ratio (H/C) of from 0.20 to 0.65, more preferably of from 0.25 to 0.55, even more preferably from 0.25 to 0.45.

The tire 1 further comprises a belt structure 5 interposed between the carcass structure and the tread band. The belt structure of the tire according to the invention comprises a first, a second and a third belt layers 51, 52, 53 which incorporate a plurality of reinforcing cords. Preferably, the third belt layer 53 has a width which corresponds to the width of the first belt layer 51. The second belt layer 52 has preferably a width which is higher than the width of the third belt layer.

Figure 3:
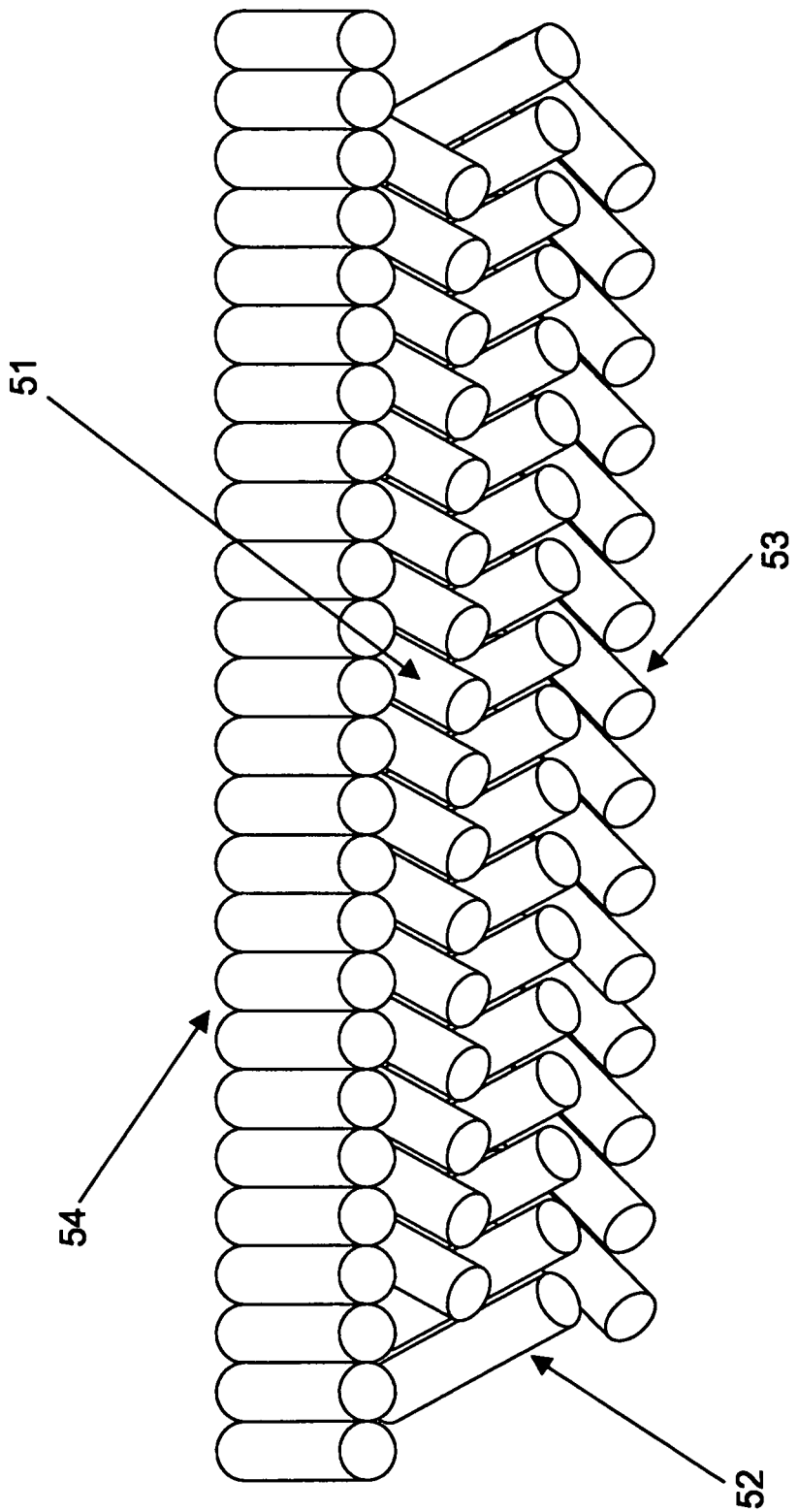
FIG. 3 shows a different schematic representation of the reinforcing elements of the belt structure according to an embodiment of the invention with a zero degree layer.

FIG. 3 schematically shows a belt structure according to the present invention.

The reinforcing elements of the zero degree belt layer 54 are usually made of textile cords, e.g. nylon cords, aramide cords or hybrid cords (i.e. combinations in the same cords of filaments of different types, e.g. aramide filaments and nylon filaments; see e.g. EP 0,335,588 B1).

Each of the first, second and third belt layers 51, 52, 53 comprises a plurality of substantially parallel elongated reinforcing elements 511, 521, 531, respectively. Such reinforcing elements 511, 521, 531 generally are metal cords. The reinforcing elements 511, 521, 531 are embedded in a rubber material and are arranged in a manner so as to form a rubberized fabric.

The reinforcing elements 511 of the first belt layer 51 are preferably made of steel cords. A standard NT (Normal Tensile) steel or a HT (High Tensile) steel, a SHT (Super High Tensile) steel or a UHT (Ultra High Tensile) can be used.

Usually, said steel cords 511 are provided with a coating of a corrosion resistant alloy, e.g. a brass coating, usually having a thickness of between 0.10 μm and 0.50 μm. Said coating ensures better adhesion of the cords to the rubberizing compound and provides for protection against corrosion of the metal, both during production of the tire and during use thereof. The steel cords are usually embedded in a rubber composition according to well known techniques.

Preferably, the end count (or density) of cords 511 and 521 in the first and second belt layers 51, 52, respectively, is in a range of from 40 cords/dm to 160 cords/dm.

Preferably, the reinforcing elements 511 of the first belt layer 51 are disposed at a first belt angle $BA_1$ having an absolute value of from 15 to 40 degrees. In other words, $BA_1$ could be from +15 to +40 degrees or from −15 to −40 degrees.

Preferably, the end count of the elongated reinforcing elements 521 in the second belt layer 52 is the same as the end count of the elongated reinforcing elements 511 in the first belt layer 51.

Preferably, the reinforcing elements 521 of the second belt layer 52 are disposed at a second belt angle $BA_2$. The second belt angle $BA_2$ is of opposite sign with respect to the first belt angle $BA_1$. More preferably, the first and second belt angles $BA_1$ and $BA_2$ have the same absolute value.

Preferably, each of the metal reinforcing elements 531 of the third belt layer 53 is a cord comprising a number of threadlike elements 200.

According to a preferred embodiment, said threadlike elements 200 are preformed as described, for instance, in WO 2000/39385 in the name of the same Applicant of the present invention.

Figure 5:
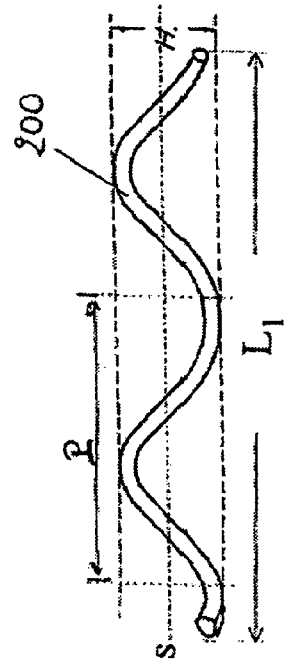
FIG. 5 shows a preformed threadlike element which can be used in a belt layer according to the present invention.

The threadlike element deformations, generally in the form of periodic deviations from a straight line, may be obtained in any form. Preferably, said deformations are of the coplanar type. Even more preferably, said deformations consist of substantially sinusoidal undulations (such as those illustrated in FIG. 5) having a wavelength (or pitch) P and a wave amplitude H as disclosed in WO 2005/014309.

"Wavelength P" is to be understood as the length of the minimum section which is repeated periodically, and "wave amplitude H" is to be understood as meaning twice the amplitude of maximum transverse deviation (assumed to be equal in both directions) of the threadlike element from the center axis S.

Preferably, the wavelength (or pitch) P is between 2.5 mm and 30.0 mm, more preferably between 5.0 mm and 25.0 mm. Still more preferably, the wavelength P is 12.5 mm.

Preferably, the wave amplitude H is between 0.12 mm and 1.0 mm, more preferably between 0.14 mm and 0.60 mm.

Generally, the preformed threadlike elements 200 according to the present invention have a diameter D of between 0.05 mm and 0.25 mm, preferably between 0.08 mm and 0.20 mm. Particularly preferred is a diameter of 0.12 mm.

As mentioned above, the threadlike elements 200 are metallic.

Preferably, the threadlike elements 200 are made of steel. In the case where the diameter of the threadlike element is between 0.4 mm and 0.1 mm, the breaking strength of a standard NT (normal tensile) steel ranges between about 2,600 N/mm² (or 2,600 MPa) and about 3,200 N/mm², the breaking strength of a HT (High Tensile) steel ranges between about 3,000 N/mm² and about 3,600 N/mm², the breaking strength of a SHT (Super High Tensile) steel ranges between about 3,300 N/mm² and about 3,900 N/mm², the breaking strength of a UHT (Ultra High Tensile) steel ranges between about 3,600 N/mm² and about 4,200 N/mm². Said breaking strength values depend in particular on the quantity of carbon contained in the steel.

Preferably, said threadlike elements are provided with a brass coating (Cu of between 60% and 75% by weight, Zn of between 40% and 25% by weight), having a thickness of from 0.10 μm to 0.50 μm. Said coating ensures better adhesion of the threadlike element to the rubberizing compound and provides for protection against corrosion of the metal, both during production of the tire and during use thereof. Should it be necessary to ensure a greater degree of protection against corrosion, said threadlike elements 200 may be advantageously provided with an anti-corrosive coating other than brass, able to ensure a greater corrosion resistance, such as, for example, a coating based on zinc, zinc/manganese (ZnMn) alloys, zinc/cobalt (ZnCo) alloys or zinc/cobalt/manganese (ZnCoMn) alloys.

Preferably, the end count of the elongated reinforcing elements 531 in the third belt layer 53 according to the present invention is from 50 cords/dm to 100 cords/dm, more preferably is from 50 cords/dm to 80 cords/dm.

Parallel elongated metal reinforcing elements 531 are disposed at a third belt angle $BA_3$. The third belt angle $BA_3$ has an absolute value of from 40 to 90 degrees and is of opposite sign with respect to the second belt angle $BA_2$. A preferred absolute value for third belt angle $BA_3$ is of from 45 to 80 degrees. More preferably, the third belt angle $BA_3$ is, in absolute value, of from 45 to 55 degrees.

Preferably, the parallel elongated metal reinforcing elements 531 of the third belt layer 53 have an ultimate elongation of at least 3.0%, preferably of at least than 3.5%. Such ultimate elongation is generally not higher than 8%.

Figure 4:
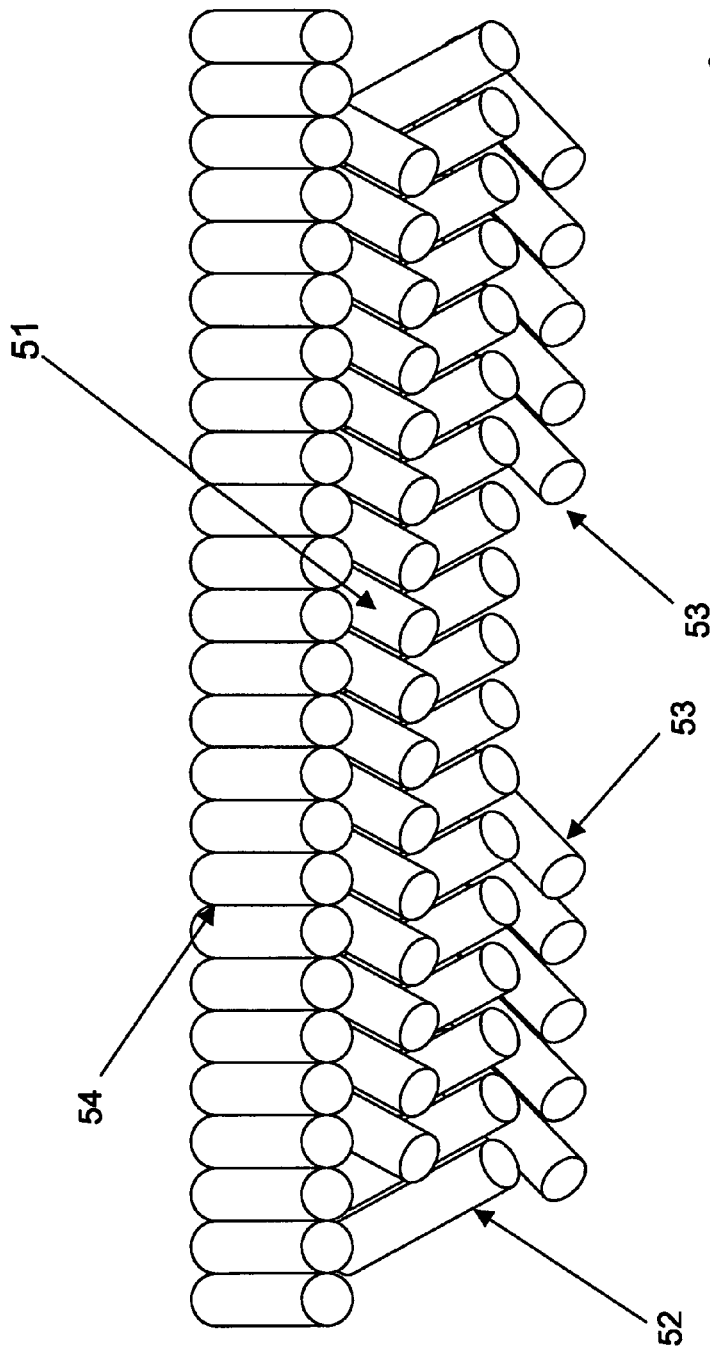
FIG. 4 shows a different schematic representation of the reinforcing elements of the belt structure according to an embodiment of the invention with a zero degree layer, wherein the third belt layer is centrally interrupted.

Although the first, second and third belt layers 51, 52 and 53 generally extend continuously along the full width of the belt structure as shown in FIGS. 1 and 3, the present invention also comprises embodiments wherein one or more of the belt layers 51, 52 and 53, and preferably only the third belt layer 53, are interrupted. Possibly one or more of the belt layers 51, 52 and 53 are interrupted in a central area crossing the equatorial plane. FIG. 4 schematically shows an embodiment wherein the third belt layer 53 is centrally interrupted. This results in an advantageous save of weight without any significative change of tire performance.

The zero degree belt layer 54 usually axially extends at least for the whole axial width of the underlying belt layers 51, 52 and 53, so as to avoid lifting of the edges of the latter during rotation at high speeds.

Figure 6:
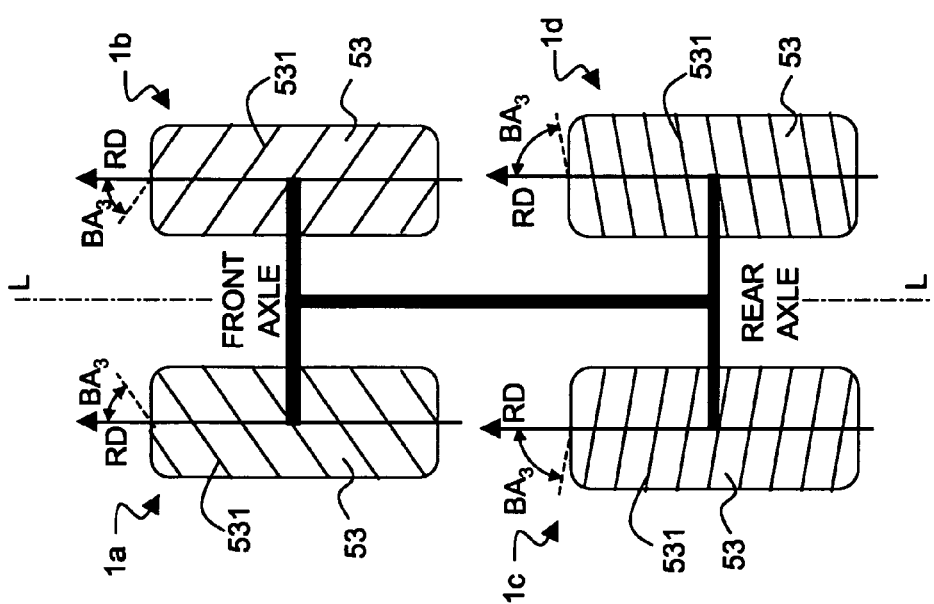
FIG. 6 shows, schematically, one possible tire arrangement in a vehicle according to the present invention.

FIG. 6 schematically shows a first exemplifying tire arrangement in a four wheel vehicle according to an advantageous embodiment of the present invention. In particular, FIG. 6 schematically shows a vehicle with a front axle and a rear axle with four tires according to the present invention. The four tires have been designed as 1a, 1b, 1c and 1d. Tire 1a is mounted on the front axle, left side. Tire 1b is mounted on the front axle, right side. Tire 1c is mounted on the rear axle, left side. Tire 1d is mounted on the rear axle, right side.

For each of tires 1a, 1b, 1c, 1d, only the direction of the reinforcing elements 531 of the third belt layer 53 has been schematically indicated. The reinforcing elements 531 of the tires in the right and left hand sides are symmetrically arranged with respect to a vehicle longitudinal axis L-L.

Table 1 below summarizes, for each tire of the arrangement of FIG. 6, a preferred range and a more preferred range for the third belt angle $BA_3$. Also a preferred range for first and second belt angles $BA_1$ and $BA_2$ (not shown in FIG. 6) is indicated.

TABLE 1

|  | $BA_3$ (preferred) [degrees] | $BA_3$ (more preferred) [degrees] | $BA_1$ (preferred) [degrees] | $BA_2$ (preferred) [degrees] |
| --- | --- | --- | --- | --- |
| Tire 1a | +50 to +75 | +65 to +75 | +15 to +25 | −15 to −25 |
| Tire 1b | −50 to −75 | −65 to −75 | −15 to −25 | +15 to +25 |
| Tire 1c | −75 to −90 | −80 to −65 | −15 to −25 | +15 to +25 |
| Tire 1d | +75 to +90 | +80 to +85 | +15 to +25 | −15 to −25 |

Figure 7:
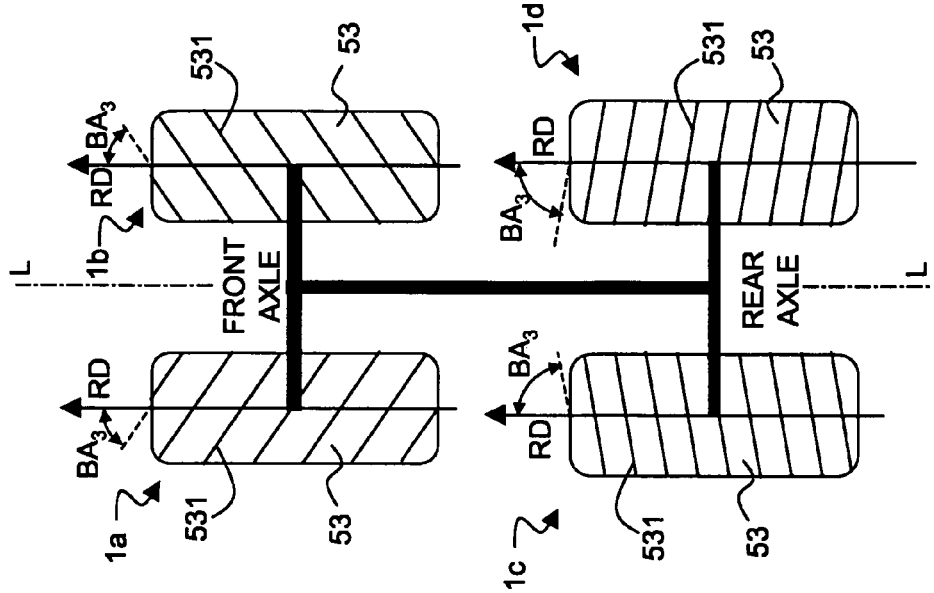
FIG. 7 shows, schematically, one further possible tire arrangement in a vehicle according to the present invention.

FIG. 7 schematically shows a second exemplifying tire arrangement in a four wheel vehicle according to an advantageous embodiment of the present invention. In particular, FIG. 7 schematically shows a vehicle with a front axle and a rear axle with four tires according to the present invention. Also the four tires of FIG. 7 have been designed as 1a, 1b, 1c and 1d. Similarly to Table 1, Table 2 below summarizes a preferred range and a more preferred range of $BA_3$ for the tire arrangement of FIG. 7. Also a preferred range for first and second belt angles $BA_1$ and $BA_2$ (not shown in FIG. 7) is indicated.

TABLE 2

|  | $BA_3$ (preferred) [degrees] | $BA_3$ (more preferred) [degrees] | $BA_1$ (preferred) [degrees] | $BA_2$ (preferred) [degrees] |
| --- | --- | --- | --- | --- |
| Tire 1a | −50 to −75 | −65 to −75 | −15 to −25 | +15 to +25 |
| Tire 1b | +50 to +75 | +65 to +75 | +15 to +25 | −15 to −25 |
| Tire 1c | +75 to +90 | +80 to +85 | +15 to +25 | −15 to −25 |
| Tire 1d | −75 to −90 | −80 to −85 | −15 to −25 | +15 to +25 |

Figure 8:
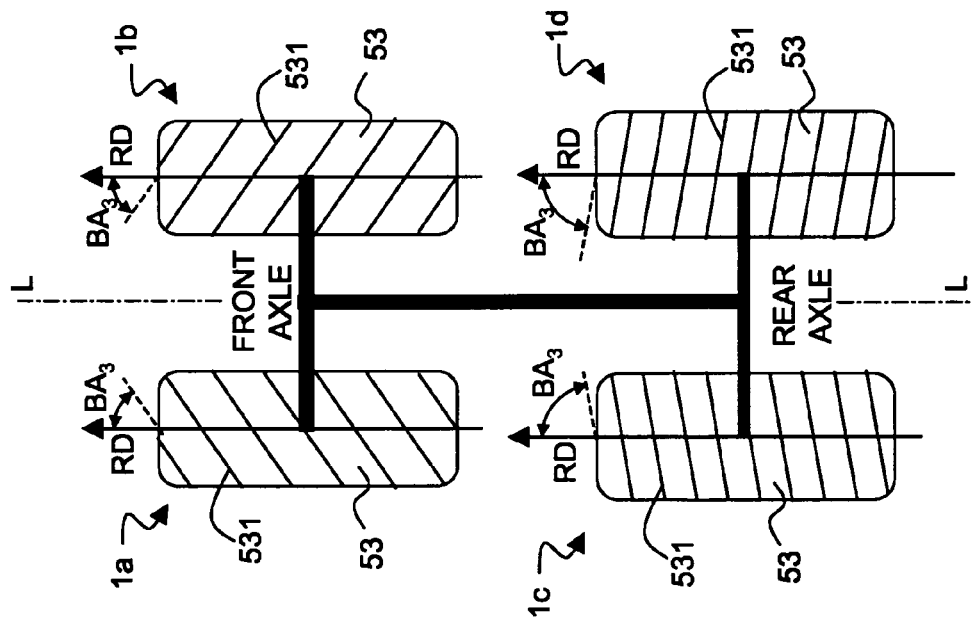
FIG. 8 shows, schematically, one further possible tire arrangement in a vehicle according to the present invention.

FIG. 8 schematically shows a third exemplifying tire arrangement in a four wheel vehicle according to an advantageous embodiment of the present invention. In particular, FIG. 8 schematically shows a vehicle with a front axle and a rear axle with four tires according to the present invention. Also the four tires of FIG. 8 have been designed as 1a, 1b, 1c and 1d. Similarly to Table 1, Table 3 below summarizes a preferred range and a more preferred range of $BA_3$ for the tire arrangement of FIG. 8. Also a preferred range for first and second belt angles $BA_1$ and $BA_2$ (not shown in FIG. 8) is indicated.

TABLE 3

|  | $BA_3$ (preferred) [degrees] | $BA_3$ (more preferred) [degrees] | $BA_1$ (preferred) [degrees] | $BA_2$ (preferred) [degrees] |
| --- | --- | --- | --- | --- |
| Tire 1a | +50 to +75 | +65 to +75 | +15 to +25 | −15 to −25 |
| Tire 1b | −50 to −75 | −65 to −75 | −15 to −25 | +15 to +25 |
| Tire 1c | +75 to +90 | +80 to +85 | +15 to +25 | −15 to −25 |
| Tire 1d | −75 to −90 | −80 to −85 | −15 to −25 | +15 to +25 |

Figure 9:
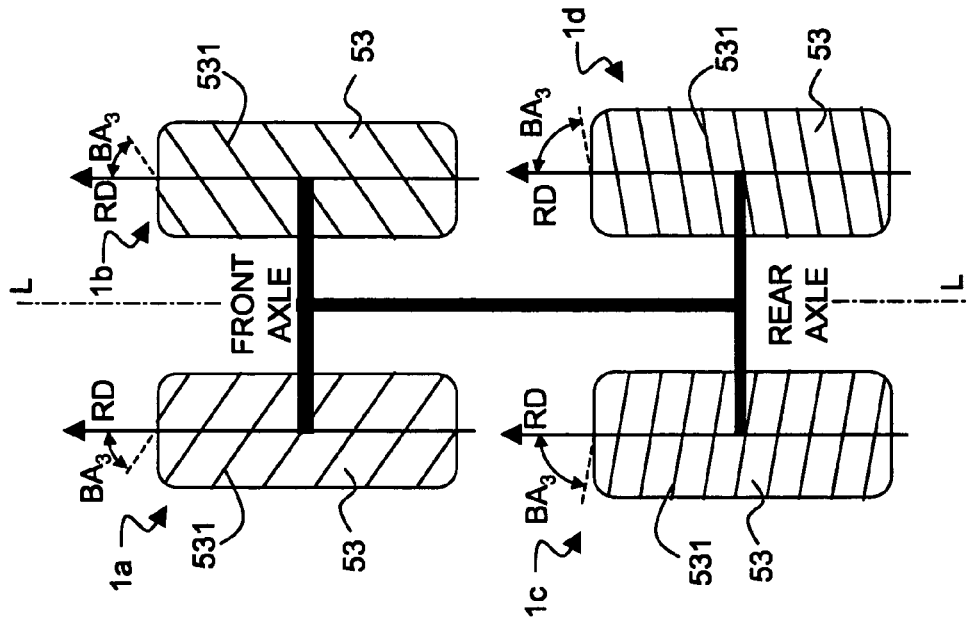
FIG. 9 shows, schematically, one further possible tire arrangement in a vehicle according to the present invention.

FIG. 9 schematically shows a fourth exemplifying tire arrangement in a four wheel vehicle according to an advantageous embodiment of the present invention. In particular, FIG. 9 schematically shows a vehicle with a front axle and a rear axle with four tires according to the present invention. Also the four tires of FIG. 9 have been designed as 1a, 1b, 1c and 1d. Similarly to Table 1, Table 4 below summarizes a preferred range and a more preferred range of $BA_3$ for the tire arrangement of FIG. 9. Also a preferred range for first and second belt angles $BA_1$ and $BA_2$ (not shown in FIG. 9) is indicated.

TABLE 4

|  | $BA_3$ (preferred) [degrees] | $BA_3$ (more preferred) [degrees] | $BA_1$ (preferred) [degrees] | $BA_2$ (preferred) [degrees] |
| --- | --- | --- | --- | --- |
| Tire 1a | −50 to −75 | −65 to −75 | −15 to −25 | +15 to +25 |
| Tire 1b | +50 to +75 | +65 to +75 | +15 to +25 | −15 to −25 |
| Tire 1c | −75 to −90 | −80 to −85 | −15 to −25 | +15 to +25 |
| Tire 1d | +75 to +90 | +80 to +85 | +15 to +25 | −15 to −25 |

The tire arrangements of FIGS. 6, 7, 8 and 9 have shown a high increase of traction performance, especially during high speed cornering maneuvers or in extreme driving conditions, e.g. while running at the limit of adherence.

Indoor Testing (Change of Diameter)

The Applicant has manufactured tires according to the present invention ("tire A") having size 245/40ZR19 and has indoor tested the change of diameter at a speed of about 300 Km/h. Tire A comprised a first belt layer with a belt angle of +27 degrees, a second belt layer with a belt angle of −27 degrees and a third belt layer with a belt angle of +70 degrees. Tire A was inflated at nominal inflation pressure. The Applicant also took a known tire ("tire B") having the same size 245/40ZR19 and the same tread pattern but devoid of the third belt layer, the belt structure having a first belt layer with a belt angle of +27 degrees and a second belt layer with a belt angle of −27 degrees. Also tire B was inflated at nominal inflation pressure. Both tires A and B had a zero degree layer of nylon cords.

A tire profile measurement device by Dr. Noll GmbH of Bad Kreuznach, Germany was used for the test. Both tires were not loaded.

From the above measurements the Applicant found that the diameter of tire B increased about 10 mm more than the diameter of tire A.

Outdoor Testing (Handling)

The handling tests were conducted on a track and the test driver simulated some characteristic maneuvering (change of lane, entering a bend, leaving a bend, for example) carried out at constant speed, in acceleration and in deceleration. Then the test driver judged the tire behavior and assigned a score depending on the tire performance during said manoeuvring.

The handling is generally divided into two voices (soft handling and hard handling) depending on the type of maneuver carried out by the test driver. The soft handling relates to the use of the tire under normal running conditions, i.e. in conditions of normal speed and good transversal grip. On the contrary, the hard handling tests describe the behavior of the tire at the limit of adherence, i.e. under extreme driving conditions. In the latter case the test driver executes maneuvers which an average driver might be forced to carry out in the case of unforeseen and hazardous circumstances: sharp steering at high speed, sudden changing of lanes to avoid obstacles, sudden braking and the like.

The vehicle used for the tests was a BMW M5 equipped with tires A of the invention according to the arrangement of FIG. 6. In particular, on the front axle two tires A of size 245/40ZR19 were mounted. Then, on the same vehicle four comparative tires B were mounted. Tires B had the same size and tread pattern of corresponding tires A, but devoid of the third belt layer. The belt structure of all the four tires B was the same, i.e. a first belt layer with a belt angle of −27 degrees, a second belt layer with a belt angle of +27. All the tires A and B had a zero degree layer of nylon cords.

The tires were fitted on standard rims and were inflated to the nominal operating pressure.

Two different types of tests were carried out: behavior at normal speed (soft handling) and behavior at the limit of adherence (hard handling).

As far as the soft handling tests were concerned, the test driver assessed: emptiness in the centre, that is the delay and the degree of response of the vehicle to small steering angles; the promptness of response to the steering coming into a bend; the progressiveness of response to the steering traveling in a bend; centring in a bend, that is the tire capacity to keep the vehicle on a bend with a constant radius without continuous steering corrections; realignment, that is the capacity of the tire to allow the vehicle to return to a rectilinear trajectory at the exit of a bend with contained and dampened transverse oscillations.

As far as the hard handling tests were concerned, the test driver assessed: the force on the steering wheel when turning violently; the promptness of insertion, that is the behavior of the tire in transition at the entrance of the bend taken at the limit speed; the balancing, that is the degree of over-steering or under-steering of the vehicle; the yield, that is the tire capacity to absorb a strong fast transfer of the load as a consequence of a sudden change of lane without excessive deformation, and therefore without compromising vehicle stability and controllability; release in a bend, that is the tire capacity to dampen the effects of instability resulting from the sudden release of the accelerator during a bend taken at the limit speed; controllability, that is the tire capacity to maintain and/or return the vehicle to the trajectory after the loss of adherence.

Table 5 below sums up the test driver's score sheet for the tires controllability. The results of said tests are expressed by means of an evaluation scale representing the subjective opinion expressed by the test driver through a point system. The values reproduced in the following table represent a mean value between those obtained in several test sessions and given by several test drivers. It should be noted that the scale of values runs from a minimum of 4 to a maximum of 9.

TABLE 5

|  |  | Tire A (invention) | Tire B (comparative) |
|---|---|---|---|
| Steering behavior (Soft handling) | Emptiness at the centre | 7+ | 6.5 |
|  | Promptness | 7 | 6.5 |
|  | Progressiveness | 7+ | 6 |
|  | Centring in bend | 6.5 | 5.5 |
|  | Realignment | 7 | 6 |
| Behaviour at limit (Hard handling) | Promptness of insertion | 7 | 6+ |
|  | Balancing | 6.5 | 6− |
|  | Yield | 7− | 6 |
|  | Release in bend | 7 | 5+ |
|  | Understeering | 6.5 | 6 |
|  | Oversteering | 7− | 6 |
|  | Controllability | 7 | 5.5 |

As it can be seen from Table 5, the tire according to the invention has notably better characteristics than the comparative tire.

For instance, tire A has high promptness and road holding (especially when the tire is mounted on the steering axle) which is derivable from the above items promptness, progressiveness, centering in bend and understeering.

Furthermore, tire A has high lateral grip which is derivable from the above items realignment, oversteering, controllability and yield.

Tire A succeeds in providing a high equilibrium between the two vehicle axes and thus a better balancing of the front and the rear of the vehicle.

Figure 10:
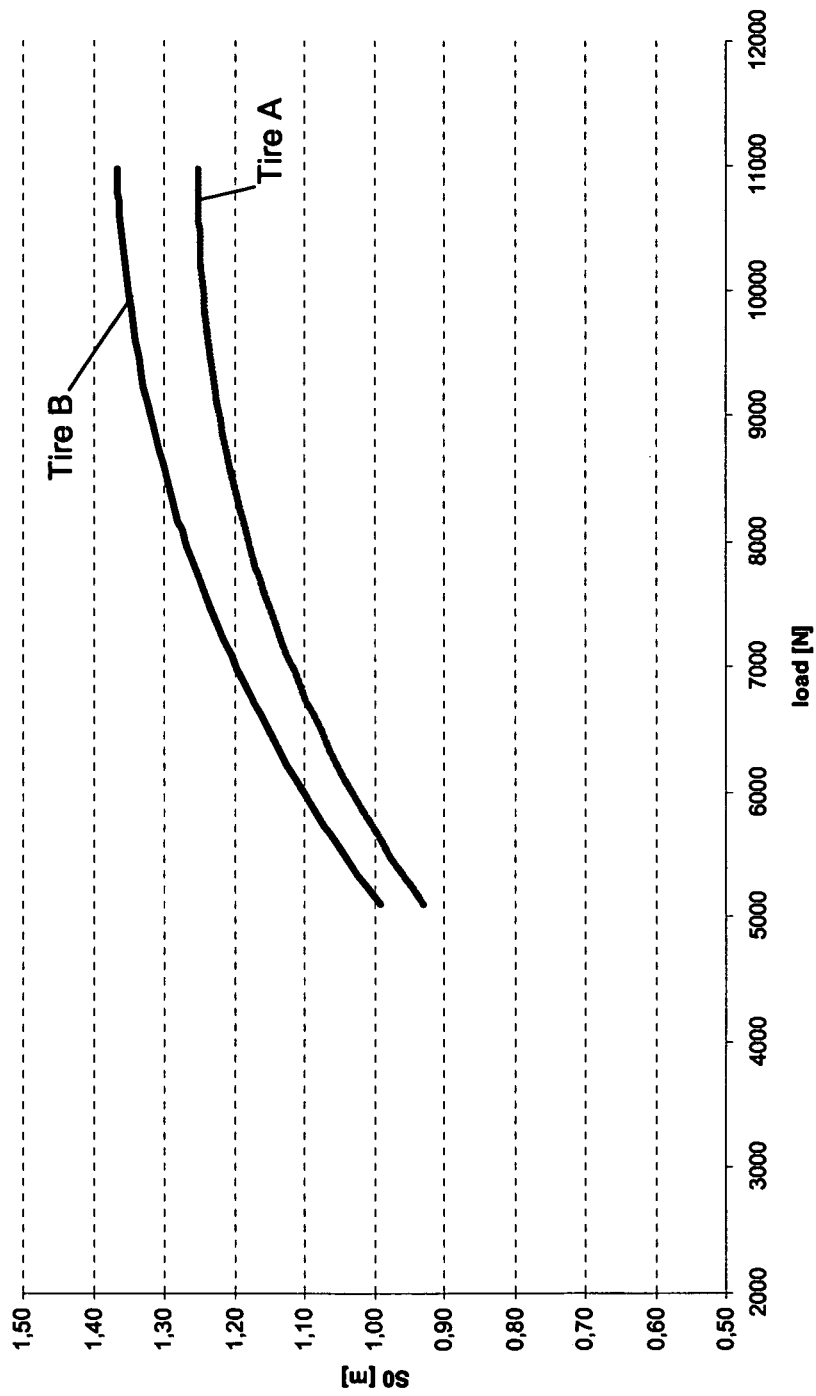
FIG. 10 is a graph of load versus relaxation length.

FIG. 10 is a graph of load [N] versus relaxation length S0 [m]. Relaxation length is indicative of promptness. Two curves are shown in FIG. 10. A first curve is relating to a comparative tire B having a size of 305/35ZR20, with a belt structure formed by a first belt layer with a belt angle of −27 degrees, a second belt layer with a belt angle of +27 degrees and a zero degree layer of nylon cords on top. A second curve is relating to a tire A of the same size, tread pattern and structure of tire B but with an additional third belt layer according to the invention having a third belt angle of +70 degrees. From FIG. 10 it becomes clear that relaxation length of tire A is lower than relaxation length of tire B at low loads. The difference increases at higher loads. This means that tire A provides a better performance than tire B, especially in hard handling conditions.

Figure 11:
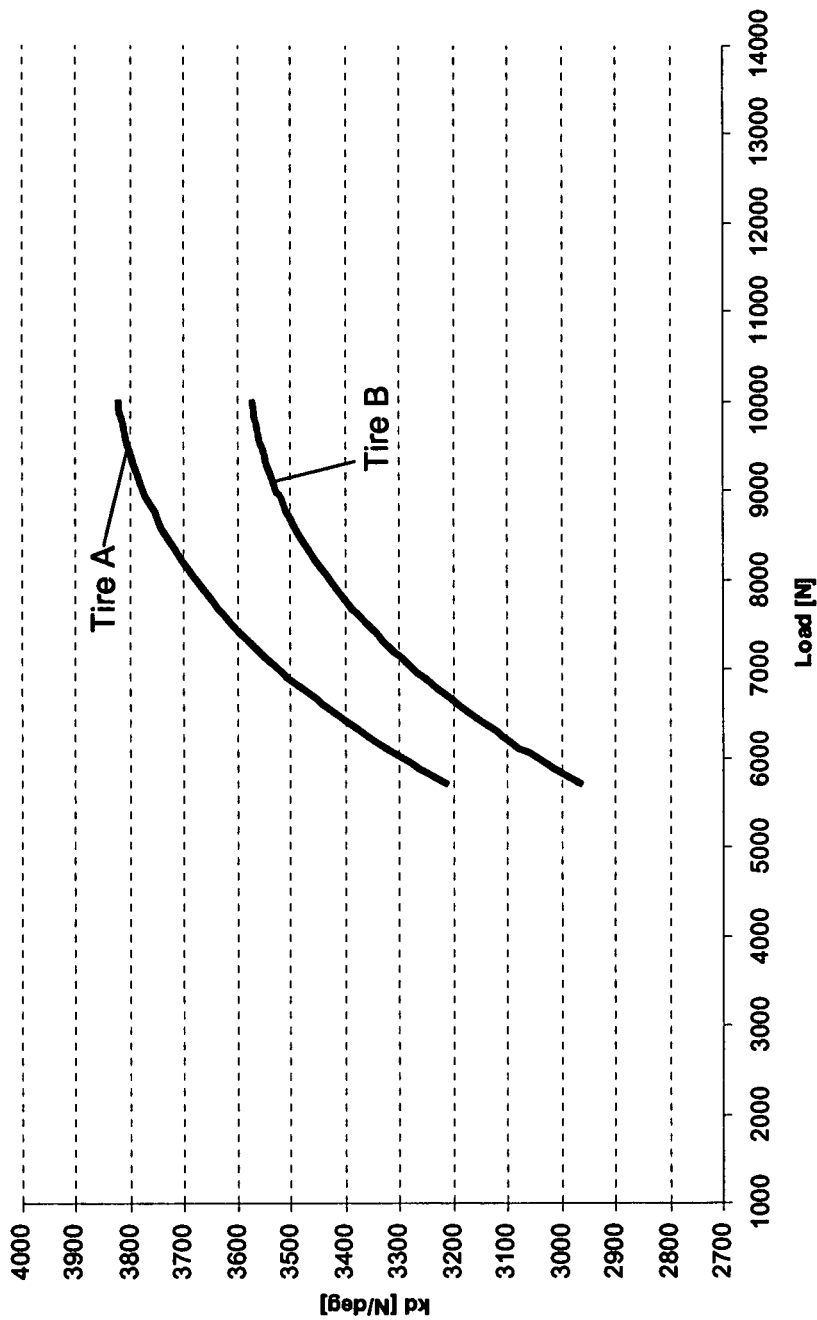
FIG. 11 is a graph of load versus tire rigidity.

FIG. 11 is a graph of load [N] versus tire rigidity kd [N/deg] measured on the same tires A and B described above for FIG. 10. From FIG. 11 it becomes clear that rigidity of tire A is well higher than rigidity of tire B at low loads. The difference increases at higher loads. This means that tire A provides a better performance than tire B, especially in hard handling conditions.

The invention claimed is:

1. A four-wheeled vehicle comprising a front axle and a rear axle, the front axle being equipped with a first tire and a second tire, the rear axle being equipped with a third and a fourth tire, wherein each of said first to fourth tires comprises:
a toroidal carcass structure comprising at least one carcass ply, said carcass structure comprising a crown portion and two axially opposite side portions, each side portion being associated with a respective bead structure for mounting the tire on a rim; a tread band in a position radially external to the carcass structure; a belt structure interposed between the carcass structure and the tread band; a pair of sidewalls applied to the carcass structure in axially opposite positions, wherein said belt structure comprises:
a first belt layer comprising a plurality of substantially parallel elongated metal reinforcing elements disposed at a first belt angle;
a second belt layer in a radially inner position with respect to said first belt layer, comprising a plurality of substantially parallel elongated metal reinforcing elements disposed at a second belt angle of opposite sign with respect to said first belt angle;
wherein said first and second belt angles have an absolute value of 15 to 40 degrees;
a zero degree belt layer placed in a radially outer position with respect to the first belt layer, said zero degree belt layer comprising elongated reinforcing elements which are substantially parallel to each other and arranged such as to form a belt angle which is substantially zero; and
a third belt layer in a radially inner position with respect to said first and second belt layers, said third belt layer comprising a plurality of substantially parallel elongated reinforcing elements disposed at a third belt angle;
wherein said third belt angle is of opposite sign with respect to said second belt angle;
wherein the third belt angle of the first tire and of the second tire has an absolute value of 50 to 75 degrees;
wherein the third belt angle of the third tire and of the fourth tire has an absolute value of 75 to 90 degrees; and
wherein the absolute value of the third belt angle of the third and fourth tires is larger than the absolute value of the third belt angle of the first and second tires by at least five degrees.

2. The four-wheeled vehicle according to claim 1, wherein:
the first tire is mounted on the front axle, left side, and its third belt angle is between +50 and +75 degrees;
the second tire is mounted on the front axle, right side, and its third belt angle is between −50 and −75 degrees;
the third tire is mounted on the rear axle, left side, and its third belt angle is between −75 and −90 degrees; and
the fourth tire is mounted on the rear axle, right side, and its third belt angle is between +75 and +90 degrees.

3. The four-wheeled vehicle according to claim 1, wherein:
the first tire is mounted on the front axle, left side, and its third belt angle is between −50 and −75 degrees;
the second tire is mounted on the front axle, right side, and its third belt angle is between +50 and +75 degrees;
the third tire is mounted on the rear axle, left side, and its third belt angle is between +75 and +90 degrees; and
the fourth tire is mounted on the rear axle, right side, and its third belt angle is between −75 and −90 degrees.

4. The four-wheeled vehicle according to claim 1, wherein:
the first tire is mounted on the front axle, left side, and its third belt angle is between +50 and +75 degrees;
the second tire is mounted on the front axle, right side, and its third belt angle is between −50 and −75 degrees;
the third tire is mounted on the rear axle, left side, and its third belt angle is between +75 and +90 degrees; and
the fourth tire is mounted on the rear axle, right side, and its third belt angle is between −75 and −90 degrees.

5. The four-wheeled vehicle according to claim 1, wherein:
the first tire is mounted on the front axle, left side, and its third belt angle is between −50 and −75 degrees;
the second tire is mounted on the front axle, right side, and its third belt angle is between +50 and +75 degrees;
the third tire is mounted on the rear axle, left side, and its third belt angle is between −75 and −90 degrees; and
the fourth tire is mounted on the rear axle, right side, and its third belt angle is between +75 and +90 degrees.

6. The tire according to claim 1, wherein said substantially parallel elongated reinforcing elements of the third belt layer are metal cords.

7. The tire according to claim 1, wherein said substantially parallel elongated reinforcing elements of the third belt layer are steel cords.

8. The tire according to claim 1, wherein an endcount of said plurality of substantially parallel elongated reinforcing elements of the third belt layer is between 50 cords/dm and 100 cords/dm.

9. The tire according to claim 1, wherein an endcount of said plurality of substantially parallel elongated reinforcing elements of the third belt layer is between 50 cords/dm and 80 cords/dm.

10. The tire according to claim 1, wherein said first and second belt angles have the same absolute value.

11. The tire according claim 1, wherein said third belt layer has a width which corresponds to a width of said first belt layer.

12. The tire according to claim 11, wherein said second belt layer has a width which is greater than the width of said third belt layer.

13. The tire according to claim 1, wherein said third belt layer is interrupted in a central area crossing a tire equatorial plane.

14. The tire according to claim 1, wherein each of the reinforcing elements of the third belt layer is a cord comprising a number of threadlike elements.

15. The tire according to claim 14, wherein said threadlike elements are preformed through deformations which are in the form of periodic deviations from a straight line.

16. The tire according to claim 1, wherein said reinforcing elements of the zero degree belt layer are made of textile cords.

17. The tire according to claim 1, wherein said tire has an aspect ratio of 0.20 to 0.65.

18. The tire according to claim 1, wherein said tire has an aspect ratio of 0.25 to 0.55.

19. The tire according to claim 1, wherein said tire has an aspect ratio of 0.25 to 0.45.

* * * * *